United States Patent [19]

Duerdoth et al.

[11] 4,023,145
[45] May 10, 1977

[54] TIME DIVISION MULTIPLEX SIGNAL PROCESSOR

[75] Inventors: Winston Theodore Duerdoth, Colchester; Christopher Anthony Brown, Ipswich; Michael Robert Miller, Colchester; Arthur Robin Potter, Suffolk, all of England

[73] Assignee: The Post Office, London, England

[22] Filed: Oct. 14, 1975

[21] Appl. No.: 621,802

[30] Foreign Application Priority Data
Oct. 18, 1974 United Kingdom ............ 45220/74

[52] U.S. Cl. .......................... 340/172.5; 179/15 A
[51] Int. Cl.² .......................................... G06F 3/00
[58] Field of Search ................... 340/172.5; 445/1; 179/15 A, 15 AL

[56] References Cited
UNITED STATES PATENTS

| | | | |
|---|---|---|---|
| 3,349,375 | 10/1967 | Seeber et al. .................. | 340/172.5 |
| 3,596,256 | 7/1971 | Alpert et al. .................. | 340/172.5 |
| 3,639,909 | 2/1972 | Hauck et al. .................. | 340/172.5 |
| 3,766,531 | 10/1973 | Cooper et al. .................. | 340/172.5 |
| 3,832,694 | 8/1974 | Judith ............................. | 340/172.5 |
| 3,883,855 | 5/1975 | Brightman et al. ............. | 340/172.5 |

*Primary Examiner*—Mark E. Nusbaum
*Attorney, Agent, or Firm*—Hall & Houghton

[57] ABSTRACT

A data processor for time division multiplex channels includes a group of storage means respective to the channels for storing program functions to be performed on the data of the respective channels, the storage means being formed as a circulating loop synchronized with the channel timing so that data and functions are available simultaneously. Entry for data from an additional processing means outside the time division multiplex channels is provided by gates controlled either by the additional processing means or by the mechanism for circulating the functions among the storage means.

9 Claims, 6 Drawing Figures

SHIFT RATE OF 4 > 20

SHIFT RATE OF 4 < 20

4,023,145

TIME DIVISION MULTIPLEX SIGNAL PROCESSOR

BACKGROUND OF THE INVENTION

This invention relates to data processors operated on a time shared basis, and particularly to such processors employed for the control of telecommunication switching systems.

Such data processors are known to comprise sets of registers for storing partial results, the current instruction, the address of the next instruction, and all other information normally known as the program context, an arithmetic and logic unit which performs data handling and logical operations, and a store or plurality of stores in which data and program instructions are held. A processor has both way connections to peripheral devices providing input data.

When a data processor is operated by a time division multiplex (TDM) input, comprising therefore a sequence of channels operating in a cyclic manner, each channel has the facility of being operated upon by a different program if desired. It is known that in order to synchronise a processor to a high speed TDM system it is necessary to have program interrupts. A processor requires a certain minimum time in order to preserve details of one program applicable to one channel before starting another program for a different channel, and this limits the maximum rate at which program changes can be accepted.

Known processors operating with such a TDM system comprise a group of registers, each register being in respect of a different program function and having a capacity for storing the data of a single channel only, but such that the group of registers is associated cyclically in synchronism with the sequence of channel inputs. Thus each register is capable of receiving and storing information only during an individual channel time. When a register has been associated with a first channel, and then a second channel starts, a program interrupt is required in order to transfer from the register the value appropriate to the first channel and insert it in a store individual to the first channel, leaving the register empty and free to be associated with the second channel. When, in the channel input cycle, the register is again associated with the first channel, the value in the store of the first channel is transferred back into the register.

The time taken to transfer the value from the register to the store and back from the store to the register, is a disadvantage in that it limits the time available for program execution during a given channel time.

The object of the present invention is to overcome this disadvantage by making program interrupts unnecessary.

SUMMARY OF THE INVENTION

According to the invention there is provided a data processor for processing data carried by a plurality of time division multiplex channels, the processor having input means for the time division multiplex channels, execution means connected to the input means and a register for storing representations of a plurality of groups of program functions to be performed on data carried by the channels, the groups being respectively allocated to the time division multiplex channels, the program function data being applied to control the execution means to cause the execution means to perform the functions on the data being applied to the execution means at the time, in which the register comprises a group of storage means equal in number to the number of time division multiplex channels, means for circulating the contents of each of the storage means of the register round the group of storage means, means for synchronising the circulating means with the time division multiplex channel switching rate, and means for deriving an output from a particular one of the storage means and applying the output to control the execution means, whereby the program functions for the time division multiplex channels are produced from the register synchronously with the data carried by the channels.

A TDM processor in accordance with the invention may be associated with non-TDM processors so that a non-TDM processor is given access to the storage means forming a register, hereafter termed a Cyclic Register, of the TDM processor. For example, in a TDM telephone exchange system, a TDM processor can be arranged to scan customer lines and junctions and report on their states. Each of these states may be compared with the previous state stored and a number of logical operations carried out on the information, the report being in a portion of the store available to all TDM channels. A non-TDM processor can then access the stored line states and evaluate as required.

A non-TDM processor may be given access to a Cyclic Register of a TDM processor by addressing one of the storage means, so that data can be read out and new data written into the storage means. Thus in the example given above of a TDM processor arranged to interpret signalling on customer lines or junctions in a telephone exchange system, the non-TDM processor can, as a call proceeds, cause the TDM processor to handle the signalling condition in a different manner, without the TDM processor being aware of how the progress of a call has been affected by the non-TDM processor.

By way of example, embodiments of the invention will now be described with reference to the accompanying drawings, of which:

As far as they apply, the same references are retained in the various drawings.

Figure 1:
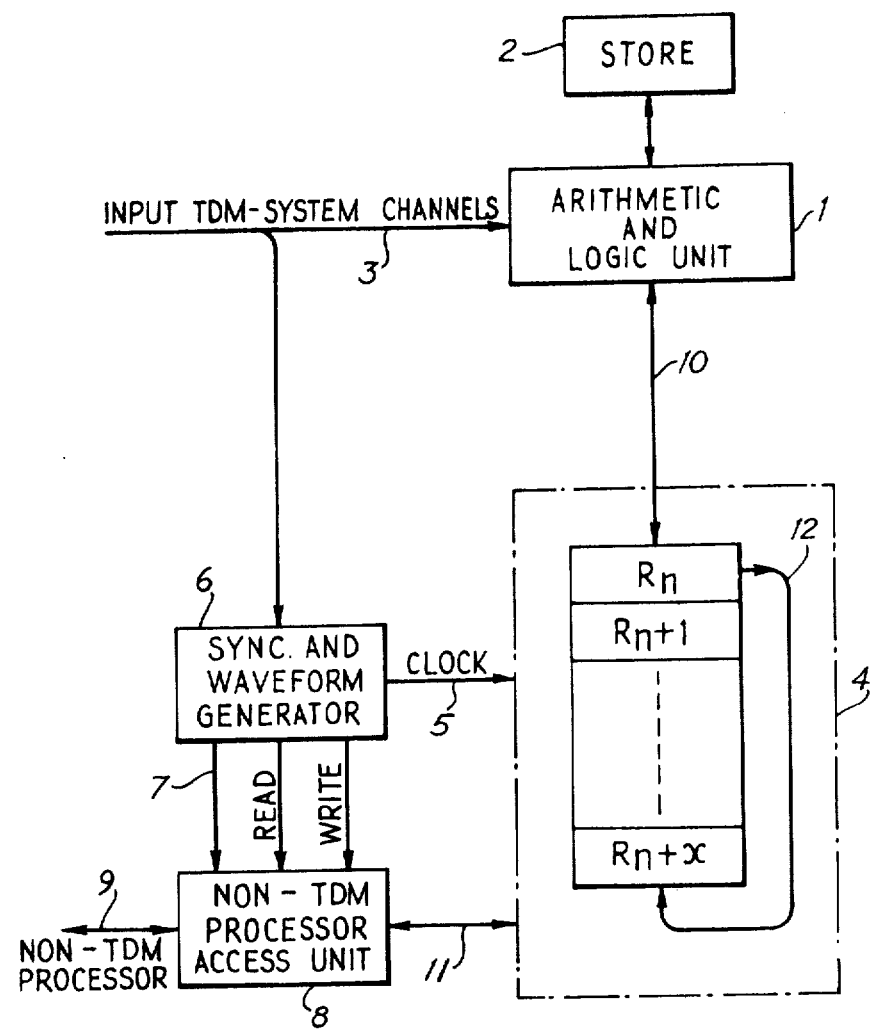
FIG. 1 is a block schematic diagram of a TDM processor in accordance with the invention.
Figure 3:
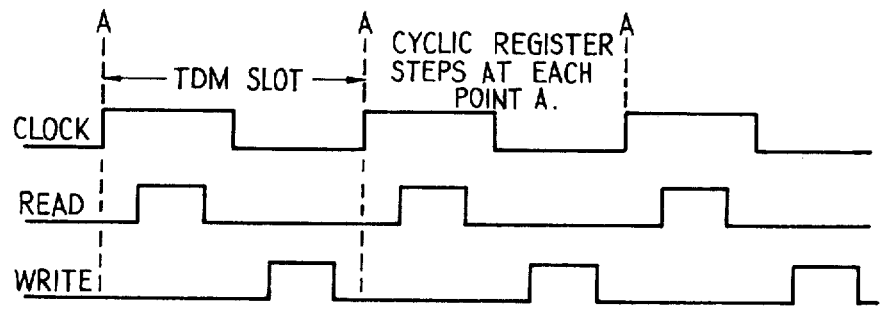
FIG. 3 shows waveform outputs of the Synchroniser and Waveform Generator shown in FIG. 1, with respect to the CLOCK, READ and WRITE pulses.

In FIG. 1 an arithmetic and logic unit 1 which may, for example, be constructed in accordance with the principles set out in Chapter 7 of Electronic Computer Technology by Norman R. Scott, McGraw-Hill Book Company 1970, is connected to a store 2 and has an input 3 for the TDM input data channels. Also connected by lead 10 to arithmetic and logic unit 1 is a cyclic register 4, to which is applied a clock input 5 from a synchroniser and waveform generator 6, to which the input 3 is also applied. An output 7 of synchroniser and waveform generator 6, together with READ and WRITE leads, are connected to an access unit 8 which provides connection 9 for a non-TDM processor. The access unit 8 is also connected by lead 11 to the cyclic register 4. The synchroniser and waveform generator 6 may include an oscillator synchronised with the TDM input signals using, for example, a ringing tuned circuit, counters and gates to produce the required outputs which are shown in FIG. 3.

Other program context cyclic registers similar to the cyclic register 4 can be connected and will operate in like manner to the register 4, but for the sake of clarity one only is shown and described.

The cyclic register 4 comprises a number of separate compartment registers $Rn \ldots Rn + x$, equal in number to the number $x + 1$ of channels in the TDM input 3. Each compartment register may include several flip-flops for data storage. The data stored in the compartment registers is shifted cyclically by the clock input 5 from synchroniser and waveform generator 6. The particular compartment register designated $Rn$, which has access by the lead 10 to the arithmetic and logic unit 1, has an output lead 12 connected as input to compartment register $Rn + x$, in order to provide the cyclic shifting of the data in the compartment registers $Rn \ldots Rn + x$. Thus the entire program context data stored in the cyclic register 4 is shifted round step by step under control of the synchroniser and waveform generator 6. When shift takes place, the current data in each compartment register moves to the next compartment register as if in parallel shifting registers, and the data in compartment register $Rn$ at any particular time can be continuously updated or utilised via the input-output lead 10. Shifting of the cyclic register 4 is permitted only when the current instruction has been executed and the results stored. Each compartment register $Rn$ of the cyclic register 4 may hold either a single current instruction to be executed or a pipeline of instructions, as is well known in the art.

A non-TDM processor is given access to the data produced by the TDM processor by means of lead 9 and access unit 8 which provides access by lead 11 to the cyclic register 4 of the TDM register processor in order to insert data into or extract data from a channel circulating in the cyclic register identified by the access unit 8.

The form of the access unit 8 may be dependent upon the relative rates of the cyclic registers and the input data from the non-TDM processor. The circuit shown in FIG. 2 is for an access unit which is suitable when the shift rate of the cyclic register is high compared with the data input rate from the non-TDM processor, such that irrespective of the compartment in the cyclic register occupied by the required channel, there is ample time for that channel to be shifted to the compartment register $Rn$ before receipt of another input from the non-TDM processor.

Figure 2:
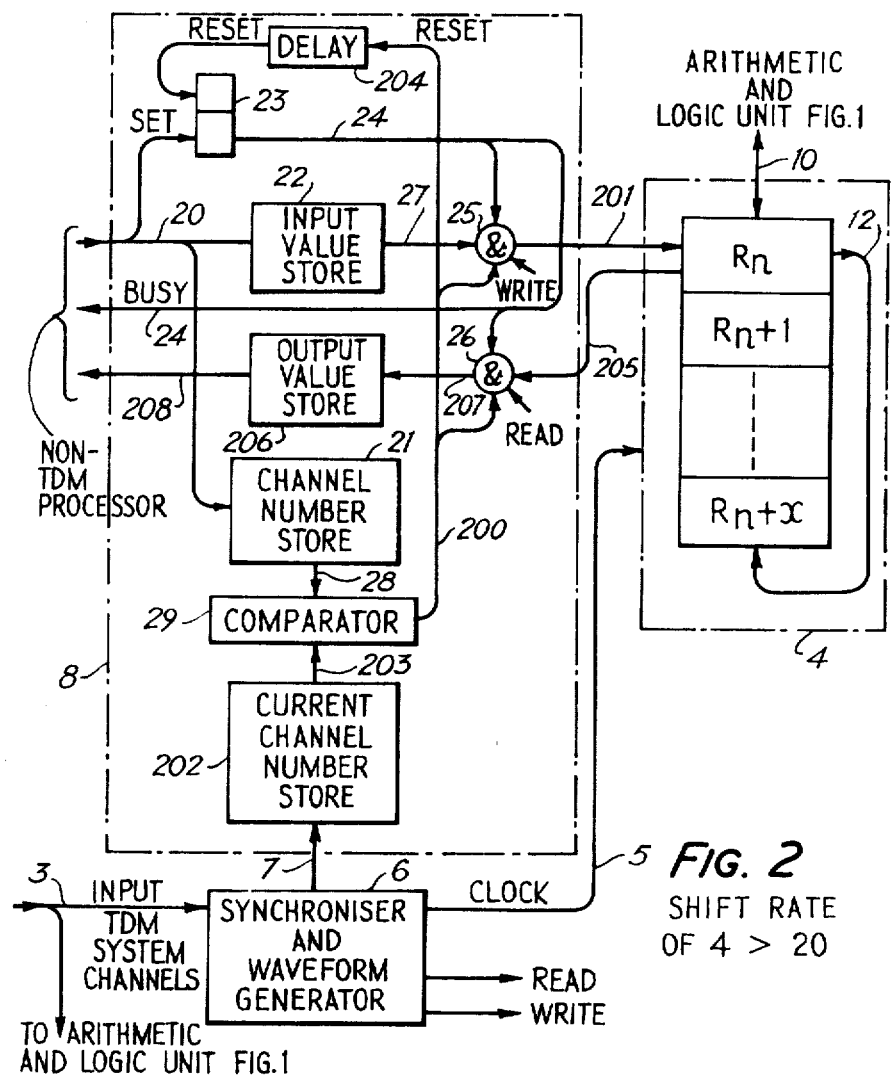
FIG. 2 is a logic diagram of a circuit of a non-TDM processor connected to the Cyclic Register of a TDM processor as shown in FIG. 1, and applicable when the shift rate of the Cyclic Register is high compared with the repetition rate from the non-TDM processor.

In FIG. 2, an input on a lead 20 from the non-TDM processor comprises a channel number relative to the TDM processor, and data to be inserted into the cyclic register 4. This information may be conveyed in a parallel or serial mode of transmission. The channel number is held in a channel number store or multi-bit register 21, and the value is held in an input value store or multi-bit register 22. An input on the lead 20 also sets a bistable 23 whose output conductor 24 carries an input to AND-gates 25 and 26, and a busy indication on the conductor 24 back to the non-TDM processor to inhibit further access to the unit 8 until the bistable 23 is reset. Output 27 of the input value store 22 is connected as a second input to the AND-gate 25. Output 28 of the channel number store 21 is connected as an input to a comparator 29, whose output 200 is connected as a third input to the AND-gates 25 and 26. Output 201 of the AND-gate 25 is connected as an input to compartment register $Rn$ of cyclic register 4.

The synchroniser and waveform generator 6, to which the TDM channels are applied as an input on the lead 3, provides a clock output on the conductor 5, and READ and WRITE pulse outputs, the waveforms of these being depicted in FIG. 3. It also has the output 7 connected as an input to a current channel number store or multi-bit register 202, such that the number of the channel which occupies the compartment register $Rn$ of the cyclic register 4 at any given time is indicated by a current channel number store 202 on output 203. When both the channel number store 21 and the current channel number store 22 indicate the same channel number to the multi-bit comparator 29, an indication is given on the output 200 to the AND-gates 25 and 26, and also to a delay means 204. The READ pulse output of the synchroniser and waveform generator 6 is connected as an input to the AND-gate 26 so that during a READ pulse the contents of the compartment register $Rn$ of the cyclic register 4 can be read out on a lead 205 and via an output 207 of the AND-gate 26, loaded into an output value store or multi-bit register 206, and made available to the non-TDM processor on an output lead 208.

During the WRITE pulse which is applied as an input to the AND-gate 25, the data stored in the input value store 22, is, via the output 27, the AND-gate 25 and the output 201, inserted into the compartment register $Rn$ of the cyclic register 4.

The output 200 of comparator 29, after a time determined by the delay means 204, resets the bistable 23 to inhibit the AND-gate 25 and 26 until the next input is received from the non-TDM processor, and removes the busy signal fed back to the non-TDM processor.

Figure 4:
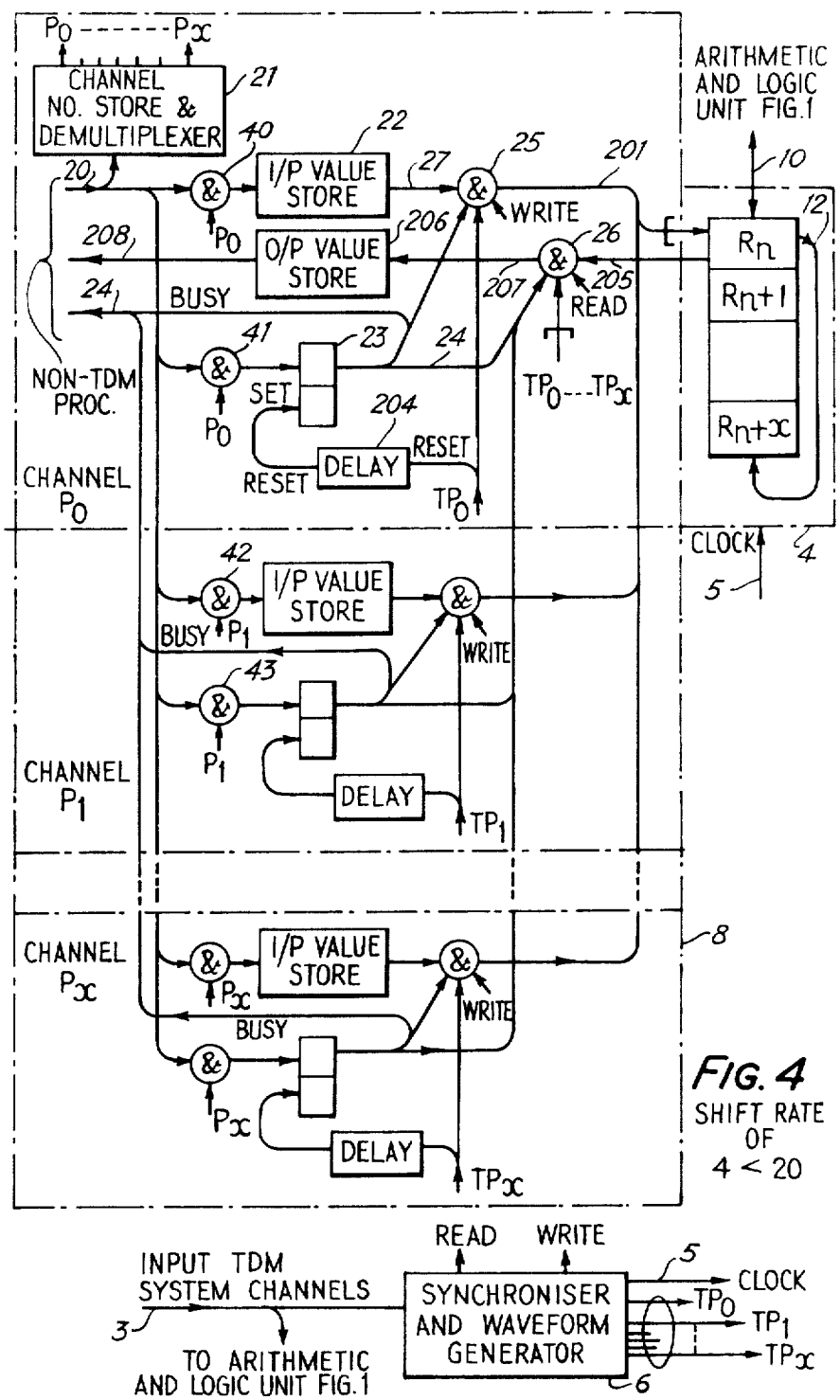
FIG. 4 is a logic diagram of a circuit of a non-TDM processor connected to the Cyclic Register of a TDM processor as shown in FIG. 1, and applicable when the shift rate of the Cyclic Register is low compared with the repetition rate from the non-TDM processor.

FIG. 4 shows an arrangement for the access unit 8 that is suitable when the shift-rate of the cyclic register is slow compared with the input reate from the non-TDM processor, when it is possible for second iput data to be received before the cyclic register has cycled the required channel to the $Rn$ compartment register to deal with the first data. The data to be inserted into the cyclic register 4 is received from the non-TDM processor on the input lead 20 at a time $Po \ldots$ or $Px$ of one of the channels. The input 20 is applied to the channel number store and demultiplexer 21, and also in common to each of a series of pairs of AND-gates, such as, for example, AND-gates 40 and 41 for channel P0, and AND-gates 42 and 43 for channel P1. To each of these pairs of gates is applied as a second input, the respective channel pulse derived from the channel number store and demultiplexer 21, such as P0 to the AND-gates 40 and 41, and P1 to the AND-gates 42 and 43. Thus that pair of AND-gates which is appropriate to the incoming channel time will be opened. Assuming the first data is being received in channel time P0, then the AND-gate 40 is opened and the data is stored in an input value store 22, whose output 27 is applied as an input to the AND-gate 25, while the AND-gate 41 is opened to set the bistable 23, whose output 24 is applied as an input to both the AND-gates 25 and 26, and also as a busy indication back to the non-TDM processor to inhibit any further access until the bistable 23 is reset. The channel number store and demultiplexer 21 may consist of integrated circuit demultiplexer, such as SN 74154 together with a suitable parallel in, parallel out register, such as SN 54116.

The synchroniser and waveform generator 6 to which the input TDM channels are applied on the lead 3, provides, in addition to the clock output 5 for driving the cyclic register 4, output READ and WRITE leads, and also a cyclic set of pulse outputs TP0 ... TP$x$ equal in number to the number of input TDM channels, i.e. equal to the number of compartments in the cyclic register 4. Each of the leads TP0 ... TP$x$ is applied as input to a respective AND-gate, and is also connected via an associated delay means to reset the bistable. For example, TP0 is connected to the AND-gate 25 and via the delay means 204 to reset the bistable 23. In addition the outputs TP0 ... TP$x$ are connected in common as inputs to the AND-gate 26.

Thus the compartment register R$n$ of cyclic register 4 can have data read out from it and written into it, in a manner as previously described with reference to FIG. 2. Because, as already stated, the arrangement of FIG. 4 is suitable when the shift rate of the cyclic register 4 is slow compared with that of the input rate from the non-TDM processor, it will be seen that for a READ or WRITE operation, relative to an incoming channel, it is necessary to wait until the synchroniser and waveform generator 6 has reached the position of the input channel, i.e. when the correct TDM channel has reached the compartment register R$n$ of the cyclic register 4, so that for example, an input for incoming channel P0 to the AND-gate 40 is stored in the input value store 22 until the synchroniser and waveform generator 6 applies pulse TP0 to the AND-gate 25 and 26.

Figure 5:
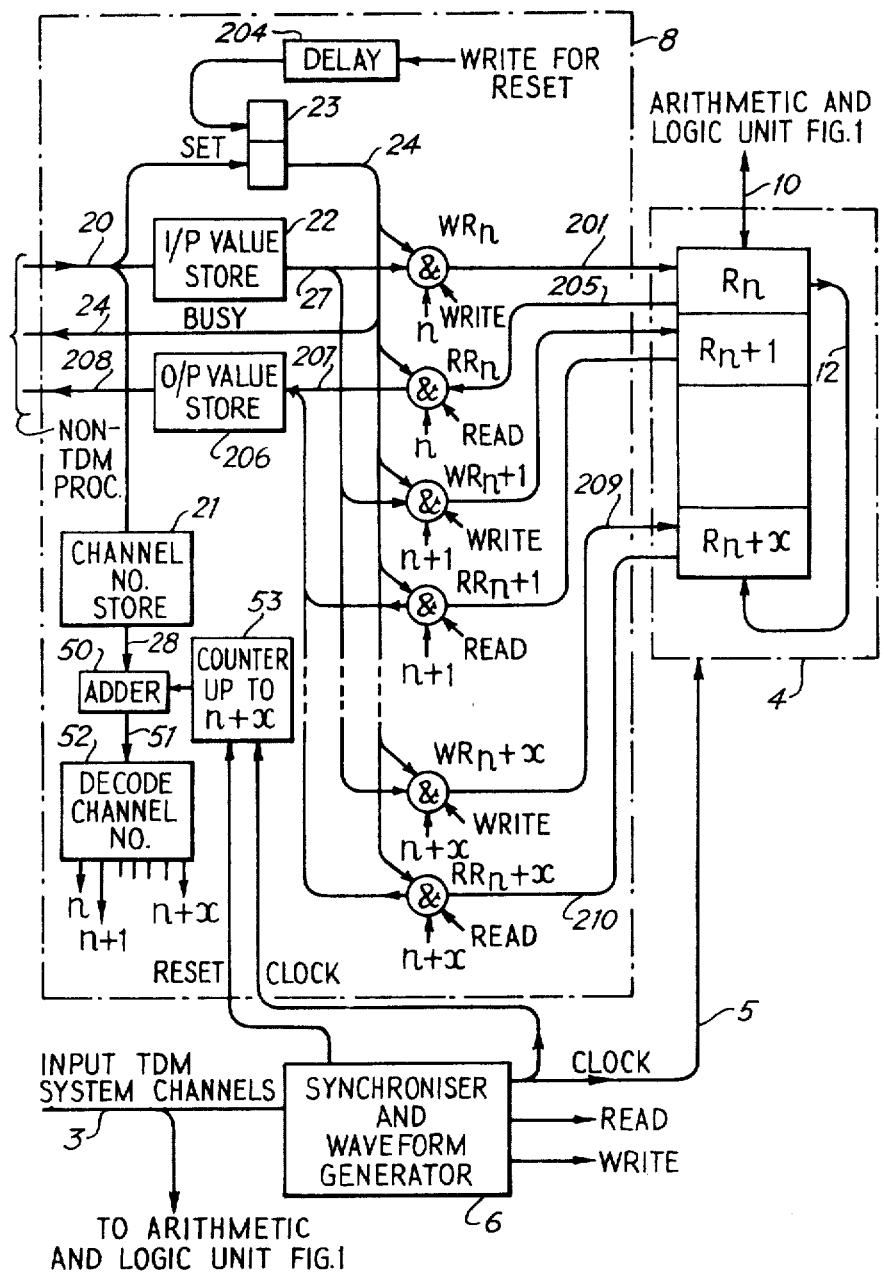
FIG. 5 is a logic diagram of a circuit of a non-TDM processor connected to the Cyclic Register of a TDM processor as shown in FIG. 1, which is independent of the relative rates of the Cyclic Register and the circuit of the Non-TDM processor.

The arrangement shown in FIG. 5 provides time independent access to the cyclic register 4 so that the channel corresponding to incoming data from the non-TDM processor does not have to reach the compartment register R$n$ of the cyclic register 4 in order for a READ-WRITE operation to take palce, As before, an input on the lead 20 from the non-TDM processor comprises a value and a channel number. The channel number, inserted in the channel number store 21 is fed via output 28 an adder circuit 50 and its output 51 to be decoded in a decode channel number unit 52, to one of the outputs $n$ ... $n + x$, corresponding to the compartment registers of the cyclic register 4. Thus a particular incoming channel number will be stored in the store 21 and a READ/WRITE operation required to take place with the stored data of that channel. As however, information stored in a compartment register is shifted to the next compartment each time a clock pulse is applied to the cyclic register, it is necessary for the output 28 of the channel number store 21 to be updated before application to the decode channel number unit 52 in order to keep in step. This is accomplished by the adder circuit 50 which is updated by a counter 53 which follows the cycle of the cyclic register 4 under control of the clock 5 and reset outputs of the synchroniser and waveform generator 6.

The input on the lead 20 is also applied to the input value store 22 whose output 27 is connected as input to each of a set of WRITE AND-gates WR$n + x$, equal in number to the number of compartment registers in the cyclic register 4. The input 20 also sets the bistable 23 whose output 24 is connected to each of the AND-gates WR$n + x$, and in addition to each of a set of READ AND-gates RR$n$ ... RR$n + x$, also equal in number to the number of compartment registers in the cyclic register 4. Each of the AND-gates WR$n$ ... WR$n + x$ has an output connected as input to its respective compartment register in the cyclic register 4, such as output 201 to the compartment register R$n$, and output 209 to the compartment register R$n + x$. Each of the AND-gates RR$n$ ... RR$n + x$ has an input from its respective compartment register of the cyclic register 4, such as input 205 from the compartment register R$n$, and input 210 from the comparment register R$n + x$, and it has an output connected in common from each gate to the iput 207 of an output value store 206. Output 24 of bistable 23 is also connected as busy lead to the non-TDM processor to inhibit any further access until the bistable 23 is reset.

Thus an incoming channel that is for example, decoded as $n + 1$, can perform a READ/WRITE operation via AND-gates RR$n + 1$ and WR$n + 1$ relative to the compartment register R$n + 1$ of the cyclic register 4, these gates also having the respective pulse inputs from the decode channel number unit 52, and the relative READ or WRITE pulse. At a later time when the data stored in compartment R$n$ has been shifted to say compartment register R$n + x$, then the incoming channel number will be decoded as $n + x$, and a READ/WRITE operation will be performed via AND-gates RR$n + x$ and WR$n + x$ to compartment register R$n + x$.

Figure 6:
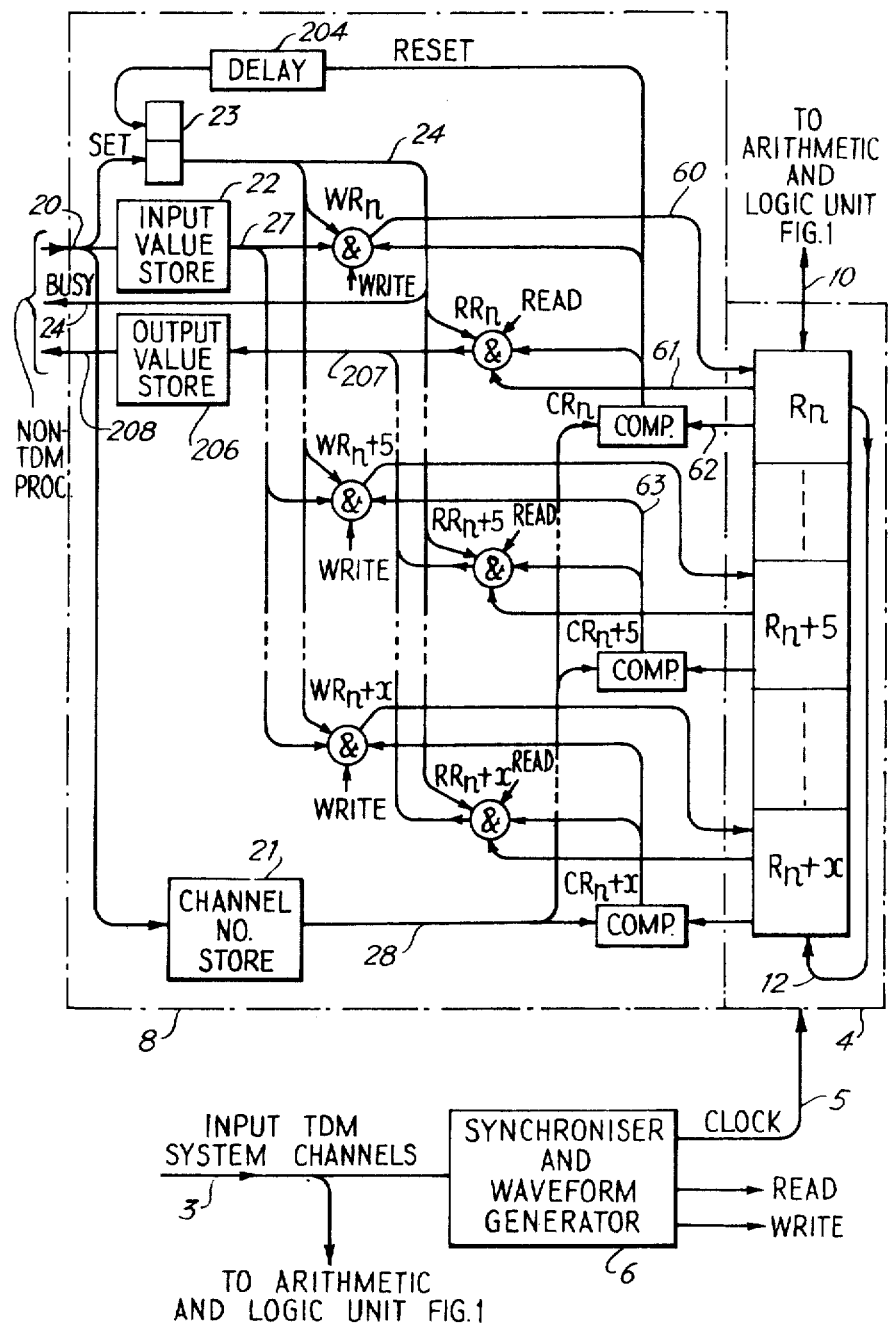
FIG. 6 is a logic diagram of an alternative arrangement to that shown in FIG. 5.

FIG. 6 shows an alternative arrangement to FIG. 5, for providing time independent access to the cyclic register 4. As described above with reference to FIG. 5 so also in FIG. 6, an input from the non-TDM processor on the lead 20, sets the bistable 23, and the channel number is inserted into the channel number store 21. The output 24 of the bistable 23 is connected as input to each of the set of READ AND-gates RR$n$ ... RR$n + x$, and to each of the set of WRITE AND-gates WR$n$ ... WR$n + x$, and it also is connected to provide a BUSY signal on lead 24 to the non-TDM processor in order to inhibit any further access until the bistable 23 is reset. Each of the WRITE AND-gates WR$n$ ... WR$n + x$ has an output, such as 60 for AND-gate WR$n$ which is connected as an input to the respective compartment register (R$n$ in this case) of the cyclic register 4, while each of the READ AND-gates RR$n$ ... RR$n + x$ has an input, such as 61 for the AND-gate RR$n$, from the respective compartment register (R$n$ in this case) of the cyclic register 4. The output 28 of channel number store 21 is connected in common, as an input to each of a set of comparators CR$n$ ... CR$n + x$, one for each compartment register of the cyclic register 4. Each of the comparator CR$n$ ... CR$n + x$ has a second input, such as 62 for CR$n$, from the respective compartment register (R$n$ in this case) of the cyclic register 4, on which at any time the compartment register provides an indication of the channel number occupying the compartment register at the particular time.

Thus following a particular channel input on the lead 10 from the non-TDM processor, the output 28 of channel number store 21 which is applied to each of the comparators CR$n$ ... CR$n + x$, will, at any particular instant in time find a match in one only of the comparators, say for example in the comparator $CRn + 5$ which receives an input from the compartment register $Rn + 5$, with the result that an output signal from the comparator $CRn + 5$ on a lead 63 is applied as an input to both AND-gates $RRn + 5$ and $WRn + 5$, so that as previously explained, a READ-WRITE operation is able to take place with the compartment register $Rn + 5$. At a later time when the stored in the compartment register $Rn + 5$ has been shifted to say the compartment register $Rn + x$, then for the same channel input on the lead 20, equality will be found in the comparator $CRn + x$, and a READ-WRITE operation can be performed by means of the AND-gates $RRn + x$ and $WRn + x$. Although the invention has been described with reference to certain specific embodiments it is not limited to these embodiments and many other arrangements using the invention can be made.

What we claim is:

1. A data processor for processing data carried by a plurality of time division multiplex channels which are switched into circuit in succession at a predetermined rate the processor having input means for receiving data from the time division multiplex channels, execution means connected to the input means and a register means for storing representations of a plurality of groups of program functions to be performed on data carrid by the channels, the groups being respectively allocated to the time division multiplex channels, decoding means for decoding the program function data and applying controls signals to control the execution means, said execution means being responsive to said control signals for performing the functions on the data being applied to the execution means by said input means said register means comprising a group of storage means equal in number to the number of time division multiplex channels, means for circulating the contents of each of the storage means of said register means round the group of storage means, means for synchronising the circulating means with the time division multiplex channel switching rate, and means for deriving an output from a particular one of the storage means and applying the output to control the execution means, whereby the program functions for the time division multiplex channels are produced from the register synchronously with the data carried by the channels.

2. A processor according to claim 1 including a further store connected to receive data from and apply data to the execution means.

3. A processor according to claim 1 further including an additional processing means and access means for connecting the additional processing means to a selected storage means.

4. A processor according to claim 3 wherein the data rate of the additional processing means is low compared with the switching rate of the time division multiplex channels, and the access means includes a transfer store for data to be transferred between the additional processing means and a particular time division multiplex channel, means for storing the number of the particular channel, a comparator which when in operation compares the number of the particular channel with the number of the channel whose data is currently stored in the particular storage means, and gating means controlled by the comparator for enabling data transfer between the transfer store and the particular storage means.

5. A processor according to claim 4 wherein the transfer store comprises a first store for data to be transferred from the additional processing means to the particular channel and a second store for data to be transferred from the particular channel to the additional processing means.

6. A processor according to claim 3 wherein the data rate of the aditional processing means is high compared with the switching rate of the time division multiplex channels and the access means includes a plurality of input stores, allocated respectively to the time division multiplex channels, a plurality of storage elements respectively corresponding to the input stores and connected to record the entry of data into the respective input stores from the additional processing means for transfer to the respective channels, a plurality of first gating means connected from the input stores to the particular storage means for effecting the data transfer to the channels, an output store and second gating means for enabling the transfer of data from a selected channel from the particular storage means to the output store, the output store being connected to the additional processing means.

7. A processor according to claim 3 wherein the access means includes an input store, an output store, a first plurality of gates connected from output of the input store to respective ones of the storage means, a second plurality of gates connected from the respective ones of the storage means to the input of the output store, and control means connected to enable a selected one of the gates to pass data thereby to transfer data from the input store to a selected channel or to transfer data from a selected channel to the output store, the additional processing means being connected to the input store and the output store.

8. A processor according to claim 7 wherein the control means includes means for deriving an indication of the channel whose data is stored in the particular storage means, means for deriving from the additional processing means an indication of a channel to be selected, adding means for adding the two indications, and means responsive to the sum signal from the adding means to enable a selected gate to pass data.

9. A processor according to claim 7 wherein the control means includes means for deriving from the additional processing means an indication of a channel to be selected, means for deriving from each storage means an indication of the channel whose data is stored therein, and a plurality of comparators connected to receive the indicators from respective storage means and compare them with the indication from the additional processing means, the outputs of the comparators being connected to enable respective gates of both first and second pluralities.

* * * * *